(12) United States Patent
Acheson et al.

(10) Patent No.: US 11,086,023 B1
(45) Date of Patent: Aug. 10, 2021

(54) SYSTEMS AND METHODS FOR GNSS RECEIVERS

(71) Applicant: Rockwell Collins, Inc., Cedar Rapids, IA (US)

(72) Inventors: John E. Acheson, Hiawatha, IA (US); Thomas V. Dewulf, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 346 days.

(21) Appl. No.: 15/986,647

(22) Filed: May 22, 2018

(51) Int. Cl.
*G01S 19/30* (2010.01)

(52) U.S. Cl.
CPC ................................. *G01S 19/30* (2013.01)

(58) Field of Classification Search
CPC ........................................................ G01S 19/30
USPC ................................................... 342/357.69
See application file for complete search history.

(56) References Cited

U.S. PATENT DOCUMENTS

| | | | | |
|---|---|---|---|---|
| 4,112,496 A | * | 9/1978 | Stevens | G01S 13/288 29/830 |
| 4,837,786 A | * | 6/1989 | Gurantz | H04B 1/707 370/206 |
| 5,448,571 A | * | 9/1995 | Hong | H04L 7/042 370/514 |
| 2004/0037311 A1 | * | 2/2004 | Willes | H04B 3/54 370/465 |
| 2020/0142046 A1 | * | 5/2020 | Ouderkirk | G01S 13/42 |

* cited by examiner

*Primary Examiner* — Bo Fan
(74) *Attorney, Agent, or Firm* — Suiter Swantz pc llo (57) ABSTRACT

A global navigation satellite system (GNSS) receiver can include a code generator, a signal correlator circuit, and a processor. The code generator can generate samples of a plurality of ranging codes associated with corresponding GNSS transmitters. The signal correlator circuit can receive, according to a first clock rate, samples of a signal from a GNSS transmitter, and update, according to a second clock rate and a time division multiplexing scheme, cross-correlation values indicative of cross-correlations between the signal and a subset of the plurality of ranging codes. The second clock rate can be equal to at least multiple times the first clock rate. The signal correlator circuit can determine final results of the cross-correlation values based on the updating of the cross-correlation values, and a processor can identify the GNSS transmitter among the plurality of GNSS transmitters based on the final results of the cross correlation values.

19 Claims, 4 Drawing Sheets

SYSTEMS AND METHODS FOR GNSS RECEIVERS

BACKGROUND

Global navigational satellite systems (GNSS) refer to a variety of satellite navigation systems used for providing autonomous geo-spatial positioning. These satellite navigation systems include, for example, the global positioning system (GPS), the Russian global orbiting navigational satellite system (GLONASS), the European satellite navigation system Galileo, the Chinese satellite navigation systems BeiDou, and other global or regional systems. Each satellite navigation system can include a constellation of satellites deployed in orbits around the earth hat continuously transmit positioning signals. The constellation of satellites can transmit positioning signals over various frequency bands. For example, GPS satellites can transmit L1-band positioning signals having a center frequency of 1575.42 MHz, L2-band positioning signals with a center frequency of 1227.6 MHz, and L5-band positioning signals with a center frequency of 1176.45 MHz. Distinct frequency bands may be associated with different types of navigation applications, e.g., civil or military navigation.

Some satellite navigation systems, such as the GPS system, the Galileo system, and the BeiDou-2 system employ code division multiple access (CDMA). The use of CDMA allows for efficient use of frequency bandwidth by allowing simultaneous transmissions over a single center frequency by multiple satellite transmitters. In particular, satellite transmitters use different ranging codes (or chipping codes), therefore, allowing GNSS receivers to distinguish between positioning signals simultaneously transmitted by different satellite transmitters at a single center frequency. For each satellite transmitter, the respective ranging code can change over time. Also, a given ranging code can be used by different satellite transmitters at different time instances. A GNSS receiver decodes CDMA positioning signals using ranging codes associated with corresponding satellite transmitters. The GNSS receiver uses information decoded from a predefined number of positioning signals (e.g., four distinct positioning signals) associated with to determine, for example, its longitude, latitude, and altitude/elevation. The GPSS receiver typically maintains a number of ranging codes larger than the predefined number to increase the chances of receiving and successfully decoding a sufficient number (or the predefined number) of positioning signals at any point of time.

Increasing the number of maintained or supported ranging codes (or chipping codes) improves the reliability of the GNSS receiver. Supporting a larger number of ranging codes allows for reception (including successful decoding) of positioning signals from a larger number of satellite transmitters, and therefore, an increased likelihood (or probability) of continuous exposure to a sufficient number of positioning signals. However, such increase comes with increased complexity, higher cost, more hardware, and increased power consumption. For instance, an increase in the number of supported ranging codes can call for an increase in the number of signal decoding circuits leading to higher power consumption, higher receiver complexity and higher cost.

SUMMARY

In one aspect, the inventive concepts disclosed herein are directed to a global navigation satellite system (GNSS) receiver. The GNSS receiver can include a code generator, a signal correlator circuit, and a processor. The code generator can generate samples of a set of waveforms. Each waveform of the set of waveforms can be associated with a corresponding GNSS transmitter of a plurality of GNSS transmitters. The signal correlator circuit can receive, according to a first clock rate, samples of a first signal from a first GNSS transmitter of the plurality of GNSS transmitters. The signal correlator circuit can update, according to a second clock rate and a time division multiplexing scheme, cross-correlation values indicative of cross-correlations between the first signal and each of a subset of waveforms of the set of waveforms. The second clock rate can be equal to at least multiple times the first clock rate. The signal correlator circuit can determine final results of the cross-correlation values based on the updating of the cross-correlation values according to the second clock rate and the time division multiplexing scheme. The a processor can identify the first GNSS transmitter among the plurality of GNSS transmitters based on the final results of the cross correlation values.

The signal correlator circuit can include a circular buffer. The circular buffer can store the samples of the subset of waveforms generated by the code generator, and output, to the signal correlator circuit, time shifted streams of each of the subset waveforms. The circular buffer can output, at a first clock cycle of the second clock rate, samples of a plurality of time shifted streams of a first waveform of the plurality of waveforms, and output, at a second clock cycle of the second clock rate subsequent to the first clock cycle, samples of a plurality of time shifted streams of a second waveform of the plurality of waveforms. The circular buffer can include a write pointer and a plurality of read pointers. The signal correlator circuit can include a switch to feed the circular buffer with samples of the plurality of waveforms. The switch can alternately switch between the plurality of waveforms.

The signal correlator circuit can include a plurality of parallel correlator circuit modules, associated with distinct time-shifted versions of the plurality of waveforms, for updating the cross-correlation values indicative of cross-correlations between the first signal and each of the subset of waveforms of the set of waveforms. Each correlator circuit module can cross-correlate the first signal with versions of the plurality of waveforms time shifted by a time shift value associated with the correlator circuit module. Each correlator circuit module can include a multiplier, an adder, and a memory buffer, the memory buffer forming a closed loop with the adder.

The signal correlator circuit can receive, according to the first clock rate, samples of a plurality of signals from the plurality of GNSS transmitters. Each signal can be associated with a corresponding GNSS transmitter of the plurality of GNSS transmitters. The signal correlator circuit can include a switch communicatively coupling a plurality of input channels to a plurality of correlator circuit modules of the signal correlator circuit. Each channel of the plurality of channels can be associated with a corresponding signal of the plurality of signals, and each of the plurality of correlator circuit modules can associated with distinct time-shifted versions of the plurality of waveforms. The signal correlator circuit can cross-correlate each of the plurality of signals to time-shifted versions of a corresponding subset of waveforms of the set of waveforms. The processor can identify for each signal of the plurality of signals a corresponding GNSS transmitter of the plurality of GNSS transmitters based on the cross-correlating of each of the plurality of signals to the time-shifted versions of the corresponding subset of waveforms of the set of waveforms. The processor can determine a geographical location of the GNSS receiver based on the identified GNSS transmitters.

The GNSS receiver can include a plurality of signal correlator circuits, and one or more processors communicatively coupled to the plurality of signal correlator circuits. The plurality of GNSS transmitters can include a satellite transmitter or a pseudolite transmitter.

In a further aspect, the inventive concepts disclosed herein are directed to a signal correlator circuit for use in global navigation satellite system (GNSS) receiver. The signal correlator circuit can include a code generator interface, a circular buffer communicatively coupled to the code generator interface, and a plurality of correlator circuit modules arranged in parallel to one another. The code generator interface can provide samples of a plurality of ranging codes. Each ranging code of the plurality of ranging codes can be associated with a corresponding GNSS transmitter of a plurality of GNSS transmitters. The circular buffer can store samples of the plurality of ranging codes, and output, according to a first clock rate and a time division multiplexing scheme, time shifted streams of each of the plurality of ranging codes. Each correlator circuit module can receive, according to a second clock rate, samples of a first signal associated with a first GNSS transmitter of the plurality of GNSS transmitters. The first clock rate can be equal to at least multiple times the second clock rate. The correlator circuit module can receive, according to the first clock rate, from the circular buffer, samples of streams of the plurality of ranging codes time shifted by a time shift value associated with the correlator circuit module. The correlator circuit module can update, according to the second clock rate, cross-correlation values indicative of cross-correlations between the first signal and the streams of the plurality of ranging codes time shifted by a time shift value associated with the correlator circuit module. The correlator circuit module can determine final results of the cross-correlation values based on the updating of the cross-correlation values according to the second clock rate.

The circular buffer can include a write pointer for use to store the samples of the plurality of ranging codes, and a plurality of read pointers. Each read pointer can be used to output samples of streams of the plurality of ranging codes time shifted by a time shift value associated with the read pointer. The signal correlator circuit can include a switch, communicatively coupled to the code generator interface and to the circular buffer, to feed the circular buffer with samples of the plurality of ranging codes. The switch can alternately switch between the plurality of ranging codes. Each correlator circuit module can include a multiplier, an adder, and a memory buffer, the memory buffer forming a closed loop with the adder. The signal correlator circuit can include a switch communicatively coupling a plurality of GNSS input channels to the plurality of correlator circuit modules. The signal correlator circuit can include an accumulator buffer to store the final results of the cross-correlation values.

In a further aspect, the inventive concepts disclosed herein are directed to a method of processing global navigation satellite system (GNSS) input signals in a GNSS receiver. The method can include a code generator generating samples of a set of waveforms. Each waveform of the set of waveforms can be associated with a corresponding GNSS transmitter of a plurality of GNSS transmitters. The method can include a signal correlator circuit receiving, according to a first clock rate, samples of a first signal from a first GNSS transmitter of the plurality of GNSS transmitters. The method can include the signal correlator circuit updating, according to a second clock rate and a time division multiplexing scheme, cross-correlation values indicative of cross-correlations between the first signal and each of a subset of waveforms of the set of waveforms. The second clock rate can be equal to at least multiple times the first clock rate. The method can include a signal correlator circuit determining final results of the cross-correlation values based on the updating of the cross-correlation values according to the second clock rate and the time division multiplexing scheme. The method can include a processor identifying the first GNSS transmitter among the plurality of GNSS transmitters based on the final results of the cross correlation values.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

The details of various embodiments of the methods and systems are set forth in the accompanying drawings and the description below.

DETAILED DESCRIPTION

Before describing in detail embodiments of the inventive concepts disclosed herein, it should be observed that the inventive concepts disclosed herein include, but are not limited to a novel structural combination of components and circuits, and not to the particular detailed configurations thereof. Accordingly, the structure, methods, functions, control and arrangement of components and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the diagrams provided in this disclosure, but should be construed in accordance with the language in the claims.

Figure 1:
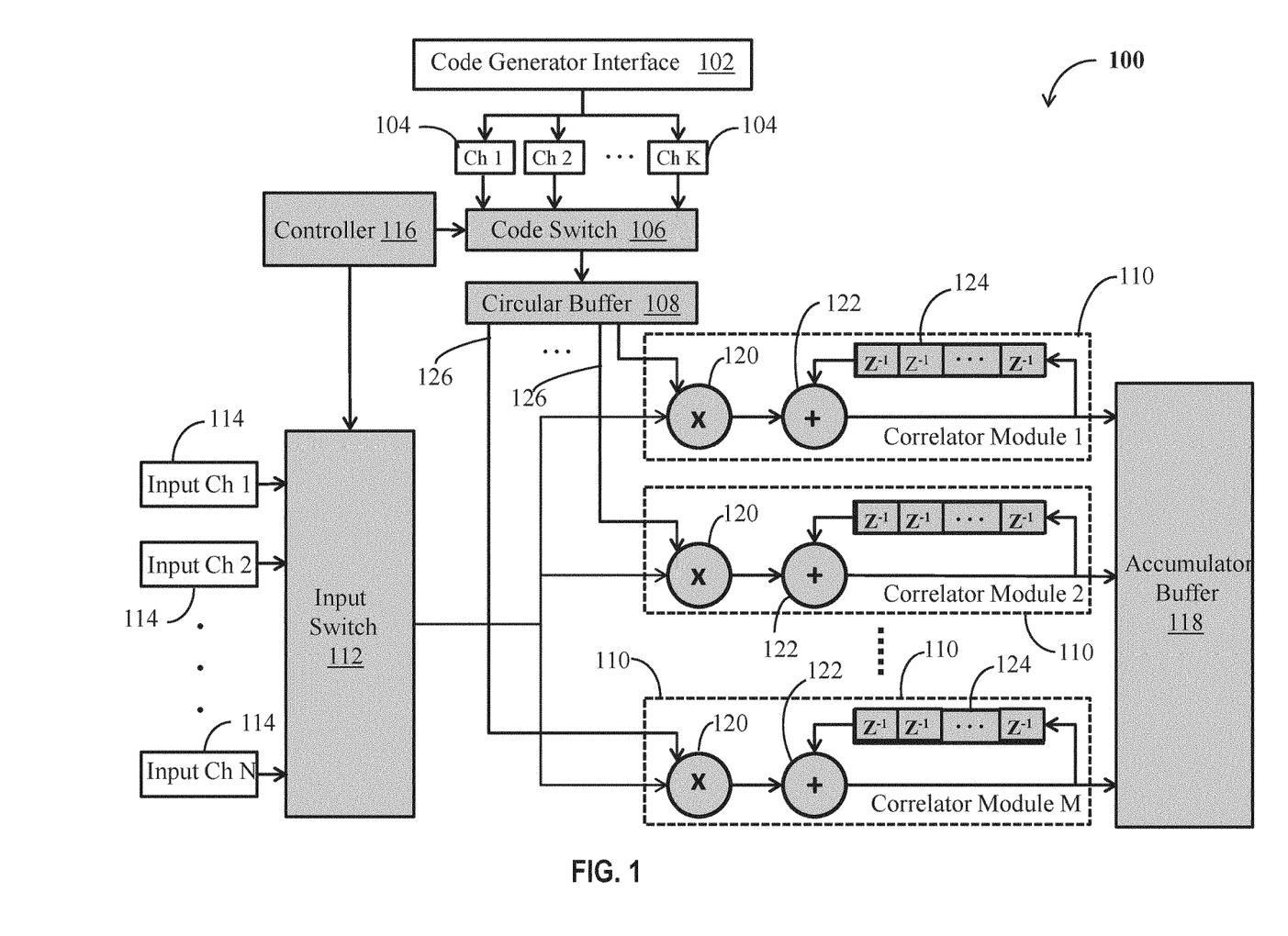
FIG. 1 shows a block diagram illustrating a streaming correlator circuit, according to inventive concepts of this disclosure.

Referring now to the drawings, FIG. 1 shows a block diagram illustrating a streaming correlator circuit (also referred to as signal correlator circuit or correlator circuit) 100, according to inventive concepts of this disclosure. The streaming correlator circuit 100 can include a code generator interface 102 for providing samples of waveforms (also referred to as ranging codes or chipping codes) associated with distinct GNSS transmitters via a plurality of code channels 104. The streaming correlator circuit 100 can include a code switch 106 for switching between the code channels 104 associated with the code generator interface 102, and a circular buffer 108 for storing taps of the waveforms provided by the code generator interface 102. The streaming correlator circuit 100 can include a plurality of correlator circuit elements (or correlator circuit modules) 110 for computing cross correlation values. The streaming correlator circuit 100 can include an input switch 112 for switching between various input channels 114, and a controller 116 for controlling the code switch 106 and the input switch 112. The streaming correlator circuit 100 can include an accumulator buffer 118 for accumulating and storing final cross-correlation values provided by the plurality of correlator circuit elements 110. Each correlator circuit element 110 can include a respective multiplier 120, a respective adder 122, and a respective buffer 124.

The streaming correlator circuit 100 can be integrated within a GNSS receiver and can receive terrestrial navigational signals (or satellite/pseudolite positioning signals) from a plurality of terrestrial navigational signal transmitters or GNSS transmitters (not shown in FIG. 1) via the plurality of input channels 114. An input signal received over an input channel 114 can be associated with a specific frequency or frequency band (e.g., L1, L2 or L5 frequency band of the GPS), a specific angle of arrival (AoA) or a range of AoAs, or a combination thereof. The GNSS transmitters (or terrestrial navigational signal transmitters) can include GNSS satellite transmitters, pseudolite transmitters, or a combination thereof. For instance, the GPS navigation system includes 32 satellites that transmit satellite positioning signals. Also, the Galileo navigation system has 30 satellites planned to be operational and transmitting satellite positioning signals. Furthermore, the BeiDou-2 navigation system includes 10 operational satellites and the BeiDou-3 navigation system has 35 satellites planned to be transmitting satellite positioning systems. In addition, pseudolites on the ground can transmit positioning signals for use, for example by GNSS receivers, for geo-spatial positioning and navigation. At any time instance, GNSS transmitters (e.g., satellite transmitters, pseudolite transmitters, or a combination thereof) transmitting positioning signals within a geographical region can use different waveforms (or ranging codes) to encode the positioning data. The streaming correlator circuit 100 can include N input channels 114, where N is an integer. The streaming correlator circuit 100 can receive through each of the input channels 114 samples of a respective input signal. Each input signal can be associated with a corresponding satellite or pseudolite positioning signal of a plurality of satellite or pseudolite positioning signals. An input signal associated with a corresponding satellite or pseudolite positioning signal may also include one or more interference components associated with, for example, one or more other satellite or pseudolite positioning signals.

Each positioning signal (or terrestrial navigational signal) can include, for example, an indication of the time at which the positioning signal is transmitted by the corresponding GNSS transmitter, an indication of the position of the corresponding GNSS transmitter at the time the positioning signal is transmitted, or a combination thereof. Also, each positioning signal can be associated with a corresponding ranging code (e.g., a pseudo-random number, pseudo-noise sequence, or a spreading code) used to encode the positioning signal. Encoding positioning signals with distinct ranging codes before transmission allows the GNSS transmitters to transmit corresponding positioning signals simultaneously at the same center frequency without jeopardizing the capability of GNSS receivers to accurately decode and distinguish between these positioning signals. For each GNSS transmitter, the respective ranging code can change over time. Also, a given ranging code can be used by different satellite transmitters at different time instances. A GNSS receiver can generate local replicates of the ranging codes (also referred to herein as waveforms) of various GNSS transmitters and use the local replicates of the ranging codes to decode received satellite/pseudolite positioning signals.

The code generator interface 102 can include, or can be communicatively coupled to, a code generator (not shown in FIG. 1). For instance, the code generator can be implemented as a component of the streaming correlator circuit 100, as a component or module of another circuit (e.g., a processor) of the GNSS receiver, as a software module, or as a separate circuit or apparatus within the GNSS receiver. The code generator can generate samples of local replicates of (or waveforms corresponding to) ranging codes of various GNSS transmitters. The code generator can include a pseudo-random number (pseudo-noise sequence) generator. The code generator can generate, for each ranging code of a plurality of ranging codes, a respective waveform (or pseudo-random number) representing a local replicate of that ranging code. Since a GNSS transmitter can switch between different ranging codes used to encode respective positioning signals, the code generator communicatively coupled to the code generator interface 102 can be synchronized with a plurality of GNSS transmitters (or code generators thereof). For example, at any time instance, the code generator can generate, for each of the plurality of GNSS transmitters, a replicate of the ranging code used by that GNSS transmitter at that time instance.

The code generator interface 102 can include (or can be communicatively coupled to) K code channels 104, where K is an integer. Each code channel 104 can provide taps of a corresponding ranging code (or waveform) of the plurality of waveforms (or codes) generated by the code generator to the correlator circuit elements (or modules) 110. For instance, taps of a first ranging code associated with a first GNSS transmitter can be available through "Ch 1," taps of a second ranging code associated with a second GNSS transmitter can be available through "Ch 2," . . . , and taps of a $K^{th}$ ranging code associated with a $K^{th}$ GNSS transmitter can be available through "Ch K." The code channels 104 can include physical channels, logic channels, memory buffers, or a combination thereof. For instance, the code generator interface can include K buffers. The code generator interface 102 can designate each of the buffers to store taps of a corresponding ranging code. The code channels 104 may be physical channels communicatively connecting the code generator interface 102 to the code switch 106. The code channels 104 may be logical channels (e.g., interleaved sequences of time slots within a time division multiplexing scheme) with each code channel 104 carrying taps of a corresponding ranging code (or waveform) from the code generator interface 102 to the code switch 106. The code channels may be parallel communication channels connecting the code generator interface to the code switch 106.

The code switch 106 can be communicatively coupled to the code generator interface 102 and the circular buffer 108, for example, via the code channels 104. The code switch 106 can receive samples (or taps) of the ranging codes via the code channels 104 and forward the samples (or taps) of the ranging codes to the circular buffer 108. The code switch 106 can alternately connect to the code channels 104 one at a time. For instance, the code switch 106 can connect at a first time instance to a first code channel 104, e.g., "Ch 1," to receive a bit (or chip or sample) of a first ranging code (or pseudo-random code) associated with a first GNSS transmitter, connect at a second time instance to a second code channel 104, e.g., "Ch 2," to receive a bit (or chip or sample) of a second ranging code (or pseudo-random code) associated with a second GNSS transmitter, connect at a third time instance to a third code channel 104, e.g., "Ch 3," to receive a bit (or chip or sample) of a third ranging code (or pseudo-random code) associated with a third GNSS transmitter, and so on and so forth.

The code switch 106 can switch between the code channels 104 at a clock rate faster than a clock rate at which samples of the input signals are received through the input channels 114 (or a sampling rate of the input signals). For example, if the samples of the input signals are received at a data clock rate/frequency, or have a sampling rate/frequency, equal to $R_1$ (e.g., expressed in MHz or million samples per second (Msps)), the processing clock rate (or frequency) at which the code switch 106 can operate or switch between the code channels 104 can be equal to $R_2 = K \times R_1$ or other multiple of $R_1$. Operating at the processing clock rate $R_2$ can allow the code switch 106, for example, to forward K samples (e.g., chips or bits) associated with the K ranging codes (or waveforms) to the circular buffer 108 during each data clock cycle $$\left(\text{e.g., } \frac{1}{R_1}\right).$$

In particular, the code switch 106 can forward a sample from each local replicate of a corresponding ranging code (or waveform) of the K ranging codes to the circular buffer 108 during each data clock cycle $$\left(\text{e.g., } \frac{1}{R_1}\right).$$

The data clock rate or frequency $R_1$ can also be viewed as the clock rate at which the input channels 114 operate.

In FIG. 1 the components shown in grey can operate at the processing clock rate $R_2$, while the doted components (e.g., the input channels 114) can operate at the data clock rate $R_1$. The white or blank components, such as the code generator interface 102 and the code channels 104, can operate at a clock rate lower than the data clock rate $R_1$. As an illustrative example, the processing clock rate $R_2$ can be equal to 524.8 MHz whereas the data clock rate $R_1$ can be equal to 43.73 MHz or 32.8 MHz with the number of codes K supported by the streaming correlator circuit 100 being equal to 12 or 16, respectively. The clock rate associated with the code generator, the code generator interface 102, or the code channels 104 can be equal to 10.93 MHz, for example. These clock rates are provided for illustrative purposes and a person skilled in the art would appreciate that other clock rates can be employed. In general, having the correlator circuit elements (or modules) 110 operate at a processing clock rate (or frequency) that is at least multiple times the data clock rate of input signals allows for sharing the correlator circuit elements (or modules) 110 by various range codes and/or various input signals, and therefore, allows for a reduction in the number of correlator circuit elements (or modules) 110 employed. Specifically, during each data clock cycle $$\left(\text{e.g., } \frac{1}{R_1}\right),$$

the correlator circuit elements (or modules) 110 can update a plurality of cross correlation values between each of one or more input signals and a plurality of ranging codes. The streaming correlator circuit 100 can be implemented, for example, in a field programmable gate array (FPGA) platform or an application-specific integrated circuit (ASIC) platform. For instance, the processing clock rate of about 525 MHz can be achieved with the 14 nano-meter (nm) technology. Also, using a processing clock rate $R_2$ of about 1.05 GHz and a data clock rate of 32.8 MHz can allow the streaming correlator circuit 100 to support 32 different codes.

The circular buffer 108 can operate, for example, at the processing clock rate $R_2$ (or $K \times R_1$). For example, the circular buffer 108 can receive K samples (e.g., K bits or K chips) associated with K distinct ranging codes per data clock cycle $$\left(\text{e.g., } \frac{1}{R_1}\right)$$

from the code generator interface 102 via the code switch 106. The circular buffer 108 can receive a new sample at each processing clock cycle $$\left(\text{e.g., } \frac{1}{R_2}\right),$$

and store the samples (e.g., chips or bits) for each of the K ranging codes (or waveforms) received from the code generator interface 102. The circular buffer 108 can output multiple (e.g., M) ranging code samples per processing clock cycle $$\left(\text{e.g., } \frac{1}{R_2}\right),$$

where M is an integer greater than or equal to 2. Specifically, the circular buffer 108 can output multiple time shifted versions of a ranging code for cross correlation with a given input signal. For example, considering an input signal X[n] and a ranging code C[n], the circular buffer 108 can store samples of the ranging code C[n] and output multiple time-shifted versions of the ranging code (e.g., the delayed versions C[n−p], C[n−p−1], . . . , C[n−p−M], where n and p are integers) to be cross-correlated with the input signal X[n]. The circular buffer 108 can output a sample of each of the time-shifted versions of the ranging code C[n] during the processing clock cycle $$\left(\text{e.g., } \frac{1}{R_2}\right).$$

The circular buffer 108 can provide the samples of each of the time-shifted versions of the ranging code C[n] to a corresponding correlator circuit element (or module) 110 of the plurality of the correlator circuit elements (or modules) 110, through a corresponding communications channel 126, for cross-correlating with the input signal X[n]. The communications channels 126 can be physical channels, logic channels, or a combination thereof. During a following processing clock cycle $$\left( \text{e.g., } \frac{1}{R_2} \right),$$

the circular buffer 108 can provide the samples of time-shifted versions of another ranging code through the communications channels 126, and so on and so forth until the circular buffer 108 loops through the K ranging codes or a subset thereof.

Figure 2:
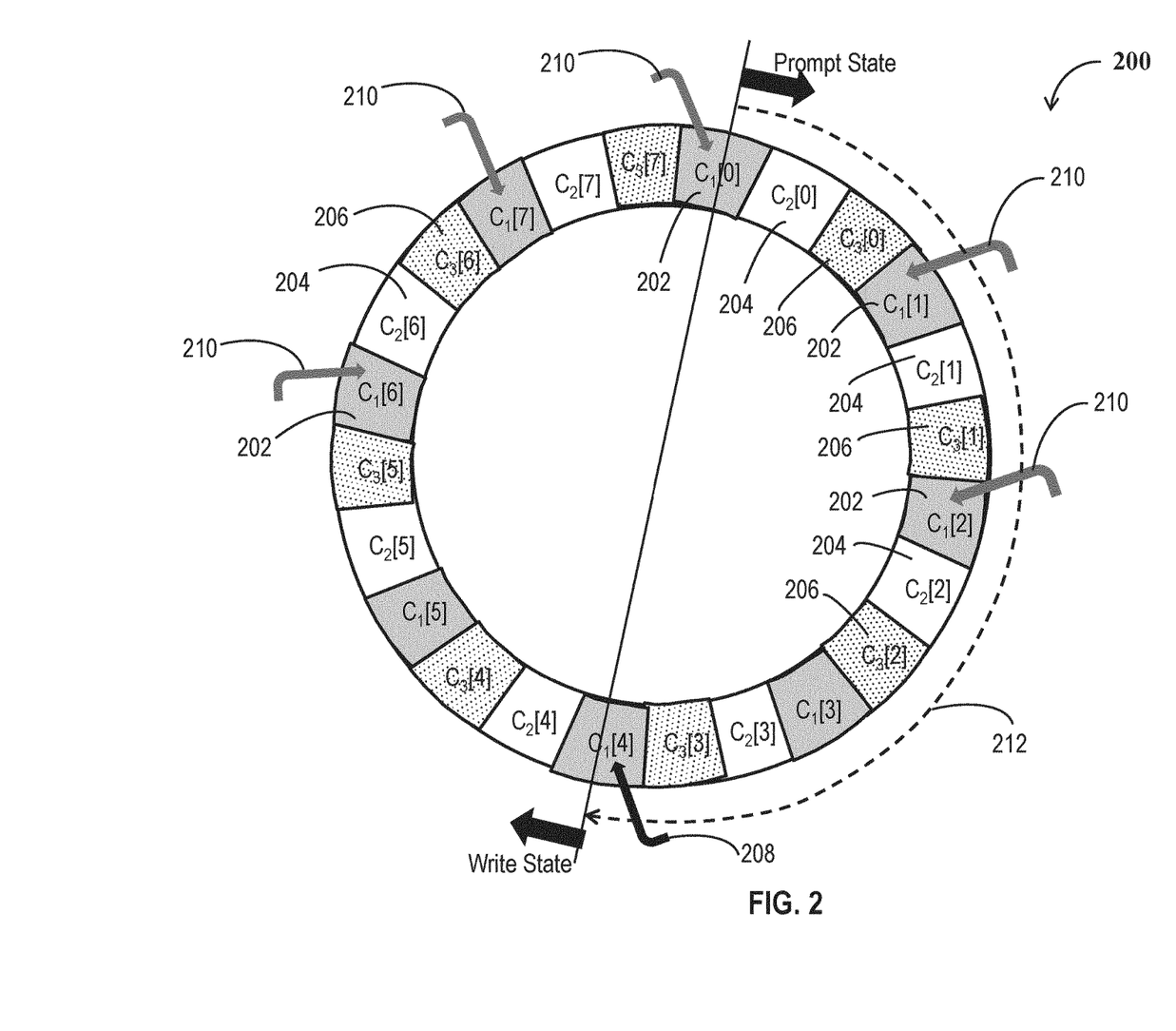
FIG. 2 shows a diagram illustrating an example circular buffer, according to inventive concepts of this disclosure.

Referring to FIG. 2, a diagram illustrating an example circular buffer 200 is shown, according to inventive concepts of this disclosure. The circular buffer 200 can represent an example implementation of the circular buffer 108 used in FIG. 1. The circular buffer 200 can include a first set of memory locations 202 to store (or storing) samples of a first ranging code $C_1$, a second set of memory locations 204 to store (or storing) samples of a second ranging code $C_2$, and a third set of memory locations 206 to store (or storing) samples of a third ranging code $C_3$. The circular buffer 200 can include a write pointer 208 representing a memory address for writing the next code sample received, or to be received, from the code switch 106, and a plurality of read pointers 210 representing the next code samples to be read and output by the circular buffer 108. While in FIG. 2, the circular buffer 200 is shown to include three sets of memory locations to store three distinct ranging codes, the circular buffer 200 can, in general, include any number of sets of memory locations to store any number of ranging codes. For example, the circular buffer 200 can be configured (e.g., based on the number of respective memory locations) to store 16, 32, or other number of ranging codes. Also, while each of the ranging codes $C_1$, $C_2$, and $C_3$ is shown to include eight respective samples, the ranging codes received and stored by the circular buffer 200 can include more, or less, than eight samples.

The circular buffer 200 can receive, store, and output samples of the ranging codes $C_1$, $C_2$ and $C_3$ according to a time division multiplexing scheme. For example, the circular buffer 200 can receive and store at a first processing clock cycle $$\left( \text{e.g., } \frac{1}{R_2} \right)$$

the first sample $C_1[0]$ of the ranging code $C_1$, receive and store at a second processing clock cycle (following the first processing clock cycle) the first sample $C_2[0]$ of the ranging code $C_2$, and receive and store at a third processing clock cycle (following the second processing clock cycle) the first sample $C_3[0]$ of the ranging code $C_3$. The circular buffer 200 can update the write pointer at each processing clock cycle $$\left( \text{e.g., } \frac{1}{R_2} \right)$$

to reflect the memory address for storing the next code sample (e.g., bit or chip) received, or to be received, from the code switch 106. The circular buffer 108 can receive and store the code samples $C_1[1]$, $C_2[1]$ and $C_3[1]$ during the next three processing clock cycles, respectively, and receive and store the code samples $C_1[2]$, $C_2[2]$ and $C_3[2]$ during the three processing clock cycles after that, and so on and so forth.

The circular buffer 200 can be read out at different time offsets to output various time-sifted streams of each ranging code, and create various time offset hypotheses. Each time shifted version (e.g., with a given time shift) of the ranging codes can represent a corresponding time offset hypothesis (e.g., hypothesis for input signal time delay compared to transmission time). The circular buffer 200 can output the time shifted streams of the ranging codes to the correlator circuit elements (or modules) 110 for cross-correlating with the input signal X[n]. The cross-correlation with various time shifted versions of the ranging codes allows a GNSS receiver to properly align the time offset of each ranging code with the time of the input signal X[n] as such time changes with the range to the respective GNSS transmitter (e.g., satellite or pseudolite transmitter).

The circular buffer 108 can output the various time-shifted versions (or streams) of each code of the ranging codes $C_1$, $C_2$ and $C_3$ using the read pointers 210. For instance, the circular buffer 108 can include a M read pointers 210 pointing to M distinct addresses associated with M corresponding ranging code samples. The M raging code samples pointed to by the M read pointers 210 can be associated with one or more ranging codes. The circular buffer 200 can use each read pointer 210 to read and stream time division multiplexed samples of various ranging codes (e.g., $C_1$, $C_2$ and $C_3$) time shifted version with a corresponding time offset value. For example, a first read pointer 210 can read and output a time division multiplexed stream of the ranging codes $C_1$, $C_2$ and $C_3$ time shifted by a first time shift value q (e.g., the time division multiplexed stream $C_1[n-q]$, $C_2[n-q]$, $C_3[n-q]$, $C_1[n-q+1]$, $C_2[n-q+1]$, $C_3[n-q+1]$, $C_1[n-q+2]$, $C_2[n-q+2]$, $C_3[n-q+2]$, ... ), and a second read pointer 210 can read and output a time division multiplexed stream of the ranging codes $C_1$, $C_2$ and $C_3$ time shifted by a second time shift value m (e.g., the time division multiplexed stream $C_1[n-m]$, $C_2[n-m]$, $C_3[n-m]$, $C_1[n-m+1]$, $C_2[n-m+1]$, $C_3[n-m+1]$, $C_1[n-m+2]$, $C_2[n-m+2]$, $C_3[n-m+2]$, ... ), where m and q are integers. Each of the read pointers 210 shown in FIG. 2 can move by one memory location during each processing clock cycle. The circular buffer 200 can use a numerically controlled oscillator (NCO) to control or update the memory addresses of the read pointers 210 (and/or the write pointer 208). The circular buffer 200 can assign a read pointer 210 to a stream of fractionally shifted versions of the ranging codes. An example of a stream of fractionally shifted versions of the ranging codes $C_1$, $C_2$ and $C_3$ can be $C_1[n-m-\frac{1}{4}]$, $C_2[n-m-\frac{1}{4}]$, $C_3[n-m-\frac{1}{4}]$, $C_1[n-m+\frac{3}{4}]$, $C_2[n-m+\frac{3}{4}]$, $C_3[n-m+\frac{3}{4}]$, $C_1[n-m+\frac{7}{4}]$, $C_2[n-m+\frac{7}{4}]$, $C_3[n-m+\frac{7}{4}]$ ... , where each sample associated with a fractional time can be estimated using the closest sample with integer time. For example, $C_1[n-m]$ can be used as an estimate of $C_1[n-m-\frac{1}{4}]$. The NCO can control the updating or adjusting of the read pointers 210, and therefore drive the steaming of the samples of the ranging codes.

The write pointer 208 can be ahead of the read pointers 110 such that at any processing clock cycle, the circular buffer 200 can have enough samples of the ranging codes $C_1$, $C_2$, and $C_3$ stored to be output to the correlator circuit elements (or modules) 110 by the read pointers 210. For instance, at the time reading and streaming of the samples of ranging codes starts (prompt state), the write pointer 208 can be ahead by (e.g., have already written) half of the samples of each ranging code. In FIG. 2, the half circle 212 can be indicative of the memory locations that were already filled with corresponding ranging codes' samples, while the other half can represent the memory locations not filled yet by the write pointer 208. The memory locations not filled yet by the write pointer 208 can be set to zero.

The use of a circular buffer, such as circular buffer 200, allows for storing a single copy of each ranging code, yet streaming multiple time-shifted versions of each ranging code according to a time division multiplexing scheme. The circular buffer 200 can store all ranging codes (e.g., K ranging codes) supported by the streaming correlator circuit 100 or a subset thereof. At each processing clock cycle, the circular buffer can write in a new sample for one of the ranging codes and read out multiple tap locations (or samples) for that ranging code.

Referring back to FIG. 1, the input switch 112 can switch, over time, between the input channels 114 (or a subset thereof) to output samples from various input signals to the correlator circuit elements (or modules) 110. The input switch 112 can output samples from multiple input signals during a single data clock cycle $$\left(\text{e.g., } \frac{1}{R_1}\right).$$

For instance, given K ranging codes associated with different GNSS transmitters (e.g., satellite or pseudolite transmitters), the correlator circuit 100 may not correlate each input signal with all the K ranging codes. Instead, the streaming correlator circuit 100 may correlate each input signal X[n] with a subset of the K ranging codes. For example, if the input signal is a GPS signal, the correlator circuit 100 can correlate only GPS ranging codes with the input signal. Similarly, if the input signal is from a Galileo satellite, the streaming correlator circuit 100 can cross-correlate the input signal only with raging codes associated with the Galileo navigation system. During a single data clock cycle $$\left(\text{e.g., } \frac{1}{R_1}\right),$$

the input switch 112 can output a sample $X_1[i]$ of a first input signal to be multiplied with samples (or chips) from a first subset of ranging codes, and another sample $X_2[i]$ of a second input signal to be multiplied with samples (or chips) from a second subset of ranging codes, where i is a sample index and $X_1$ and $X_2$ are two input GNSS signals. Specifically, during each data clock cycle $$\left(\text{e.g., } \frac{1}{R_1}\right),$$

the input switch 112 may repeatedly output the sample $X_1[i]$ during $N_1$ processing clock cycles $$\left(\text{e.g., } \frac{N_1}{R_2}\right),$$

and repeatedly output the sample $X_2[i]$ during $N_2$ processing clock cycles $$\left(\text{e.g., } \frac{N_2}{R_2}\right),$$

where $N_1$ and $N_2$ are integers and $N_1+N_2 \leq K$ (K is the number of ranging codes). As such, the correlator circuit elements 110 can cross-correlate the first input signal $X_1$ with $N_1$ ranging codes, and cross-correlate the second input signal $X_2$ with $N_2$ ranging codes.

The controller 116 can cause the code switch 106 to switch between ranging codes and/or cause the input switch 112 to switch between input signals. For instance, the controller 116 can maintain a counter associated with the code switch 106 and another counter associated with the input switch 112. The controller 116 can cause the code switch 106 to switch between different ranging codes according to the counter associated with the code switch 106, and cause the input switch 112 to switch between different input GNSS signals according to the counter associated with the input switch 112.

Each correlator circuit module 110 can be associated with a time offset hypothesis. Specifically, each correlator circuit module 110 can receive samples of an input signal (e.g., input signal X) and samples of streams of versions of the ranging codes (e.g., K ranging codes or a subset thereof) time shifted by a given time shift value (or a given time offset value). For instance, a first correlator circuit module 110 can receive streams of various ranging codes time shifted by a first time offset value $k_1$ (e.g., the time shifted ranging codes $C_1[n-k_1]$, $C_2[n-k_1]$, and $C_3[n-k_1]$), a second correlator circuit module 110 can receive streams of various ranging codes time shifted by a second time offset value $k_2$ (e.g., the time shifted ranging codes $C_1[n-k_2]$, $C_2[n-k_2]$, and $C_3[n-k_2]$), . . . , and an $M^{th}$ correlator circuit module 110 can receive streams of various ranging codes time shifted by a time offset value $k_M$ (e.g., the time shifted ranging codes $C_1[n-k_M]$, $C_2[n-k_M]$, and $C_3[n-k_M]$). At processing clock cycle $$\left(\text{e.g., e.g., } \frac{1}{R_2}\right),$$

each correlator circuit module 110 can receive a sample of a time sifted ranging code associated with that correlator circuit module 110, and update a cross correlation value indicative of a cross-correlation between that time sifted ranging code and the input signal.

Each correlator circuit module 110 can include a multiplier 120, an adder 124, and a memory buffer (or buffer register) 124. At each processing clock cycle $$\left(\text{e.g., e.g., } \frac{1}{R_2}\right),$$

the multiplier 120 can multiply an input signal sample received by the correlator circuit module 110 with a sample of a time shifted ranging code (or multiple ranging codes time shifted by a time offset value associated with that correlator circuit module 110) received by the correlator circuit module 110. The adder 122 can add the multiplication product provided by the multiplier 120 to a cross correlation value representing cross-correlation between the time shifted ranging code and the input signal. The memory buffer 124 can store cross-correlation values representing cross-correlations between the input signal and the multiple ranging codes time shifted by a time offset value associated with that correlator circuit module 110. The memory buffer 124 can form a closed loop with the adder 122, such that the cross-correlation values stored in the memory buffer 124 are shifted along the memory buffer each processing clock cycle to allow incrementing (by the adder 122) each cross-correlation value with a corresponding multiplication product output by the multiplier 120. For example, considering three distinct ranging codes $C_1$, $C_2$, and $C_3$, the memory buffer 124 can include three memory locations storing, at a given time instance, respectively, the cross-correlation values $$\sum_{j=1}^{m} C_1[j-k1] \cdot X[j], \sum_{j=1}^{m} C_2[j-k1] \cdot X[j],$$

and $$\sum_{j=1}^{m} C_3[j-k1] \cdot X[j].$$

When the samples $C_1[m+1-k_1]$ and $X[m+1]$ are received by the correlator circuit module 110, the corresponding multiplier 120 can compute the product $C_1[m+1-k1] \cdot X[m+1]$. The memory buffer can perform a left shift such that the adder 122 can add the product to the cross-correlation value $$\sum_{j=1}^{m} C_1[j-k1] \cdot X[j]$$

(e.g., stored at the left most memory location of the memory buffer 124) to obtain the adjusted cross-correlation value $$\sum_{j=1}^{m+1} C_1[j-k1] \cdot X[j],$$

which can be pushed at the right most memory location of the memory buffer 124. This process can be repeated for all the cross-correlation values stored in the memory buffer 124 multiple times until all the input signal samples and all the samples of the time shifted ranging codes are received and processed by the correlator circuit module 110. When all the input signal samples and all the samples of the time shifted ranging codes are received end, the final results of the cross-correlation values are achieved.

The components of each correlator circuit module 110 such as the multiplier 120 and the adder 122 can be implemented as modules within an FPGA platform (or circuit) or an ASIC platform (or circuit).

The accumulator buffer 118 can store the final results of the cross-correlation values. These final results can represent cross-correlations between the input signal X and multiple time shifted versions (e.g., M time shifted versions) of each ranging code of the K of ranging codes (or a subset thereof). The final results may represent cross-correlations between each of multiple input signals (e.g., $X_1, X_2, \ldots, X_r$ where r is an integer) and multiple time shifted versions (e.g., M time shifted versions) of each ranging code of a corresponding subset of ranging codes.

Figure 3:
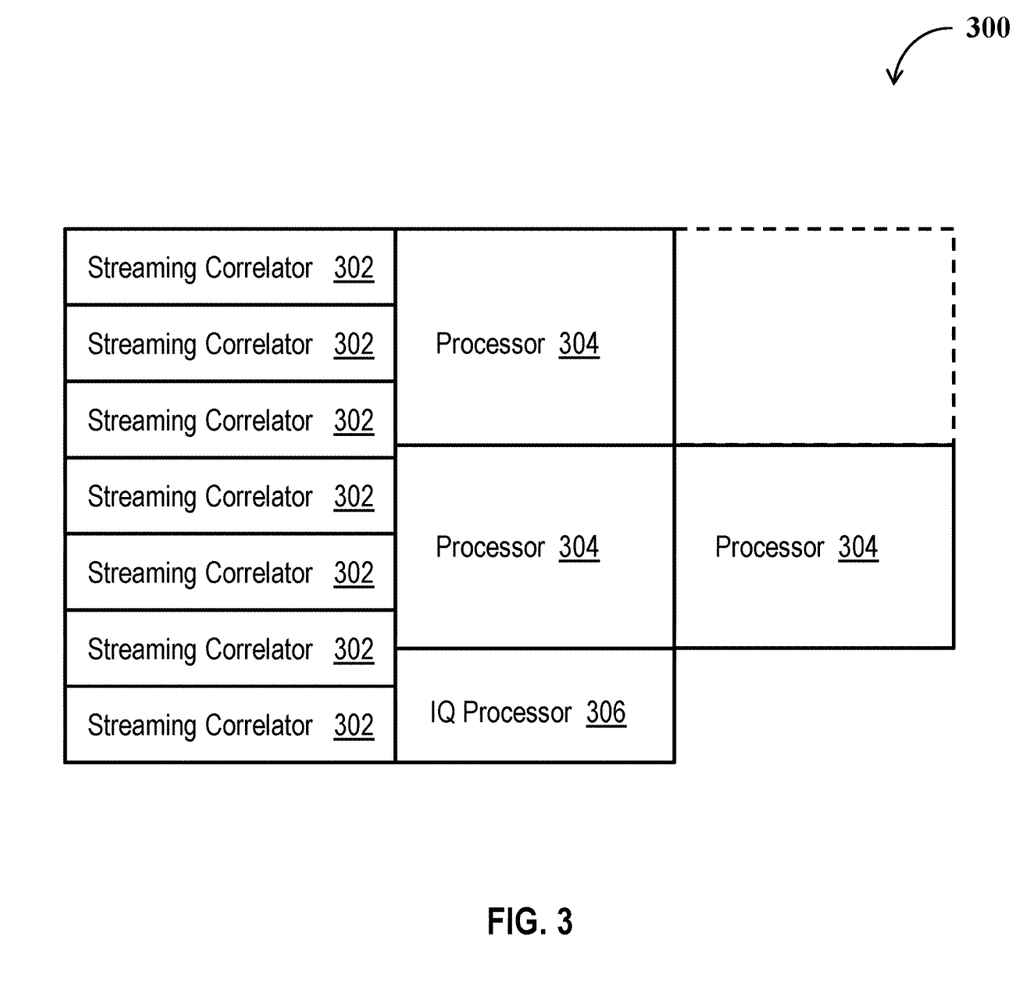
FIG. 3 shows an example implementation of a GNSS receiver, according to inventive concepts of the current disclosure.

Referring to FIG. 3, an example implementation of a GNSS receiver 300 is shown, according to inventive concepts of the current disclosure. The GNSS receiver 300 can include one or more streaming correlators 302, one or more processors 304, and an IQ processor 306. Each of the streaming correlators 302 can include the streaming correlator circuit 100. For example, the GNSS receiver 300 can include 7 streaming correlator circuits 100 each of which supporting 16 distinct ranging codes and clocked at 525 MHz leading to a total of 112 distinct ranging codes supported by the GNSS receiver 300. Each processor 304 can be an ARM® processor or other type of processor. The processor(s) 304 can perform (or execute) code discrimination functions and perform Viterbi decoding on data (e.g., input signal) symbols.

The processor(s) 304 can determine the GNSS transmitter for each received GNSS signal using the corresponding final cross-correlation values provided by the streaming correlator(s) 302. For instance, for a given GNSS signal, the ranging code of the corresponding GNSS transmitter with the "proper" time shift can produce the highest cross correlation value. Accordingly, the processor(s) 304 can identify the corresponding GNSS transmitter as that associated with the ranging code (or a time shifted version thereof) leading to the highest cross-correlation value. The time shift associated with time shifted version of the ranging code can be indicative of the distance between the GNSS receiver and the identified GNSS transmitter. Given multiple identified GNSS transmitters (e.g., associated with multiple received GNSS signals) and the distance between each of the identified GNSS transmitters and the GNSS receiver, the processor(S) 304 can determine the geographic location (e.g., latitude and altitude) of the GNSS receiver using a navigation algorithm such as triangulation or positioning techniques.

The IQ processor 306 can perform IQ demodulation of the received data (or GNSS signal) samples. The IQ processor 306 can be implemented using ASIC or FPGA technology. The IQ processor 306 can be communicatively coupled to the streaming correlator(s) 303 or the processor(S) 304. The IQ processor 306 can form fast and slow frequency bin responses, and can integrate correlator IQ data out to desired coherent integration interval (5 ms, 20 ms, etc.).

In general, the number of streaming correlators 302 and the number and type of processors 304 can vary depending on, for example, the number of ranging codes to be supported, the implementation of the GNSS receiver 300, or a combination thereof. However, the use of quad-core processor(s) 304 and the IQ processor 306 together with the streaming correlator(s) (e.g., instead of pre-processors) can lead to efficient implementation and reduction in the size of the GNSS receiver 300. Also, the GNSS receiver 300 can further include an application processor arranged at the area indicated with dashed lines without increasing the size of the GNSS receiver 300.

Figure 4:
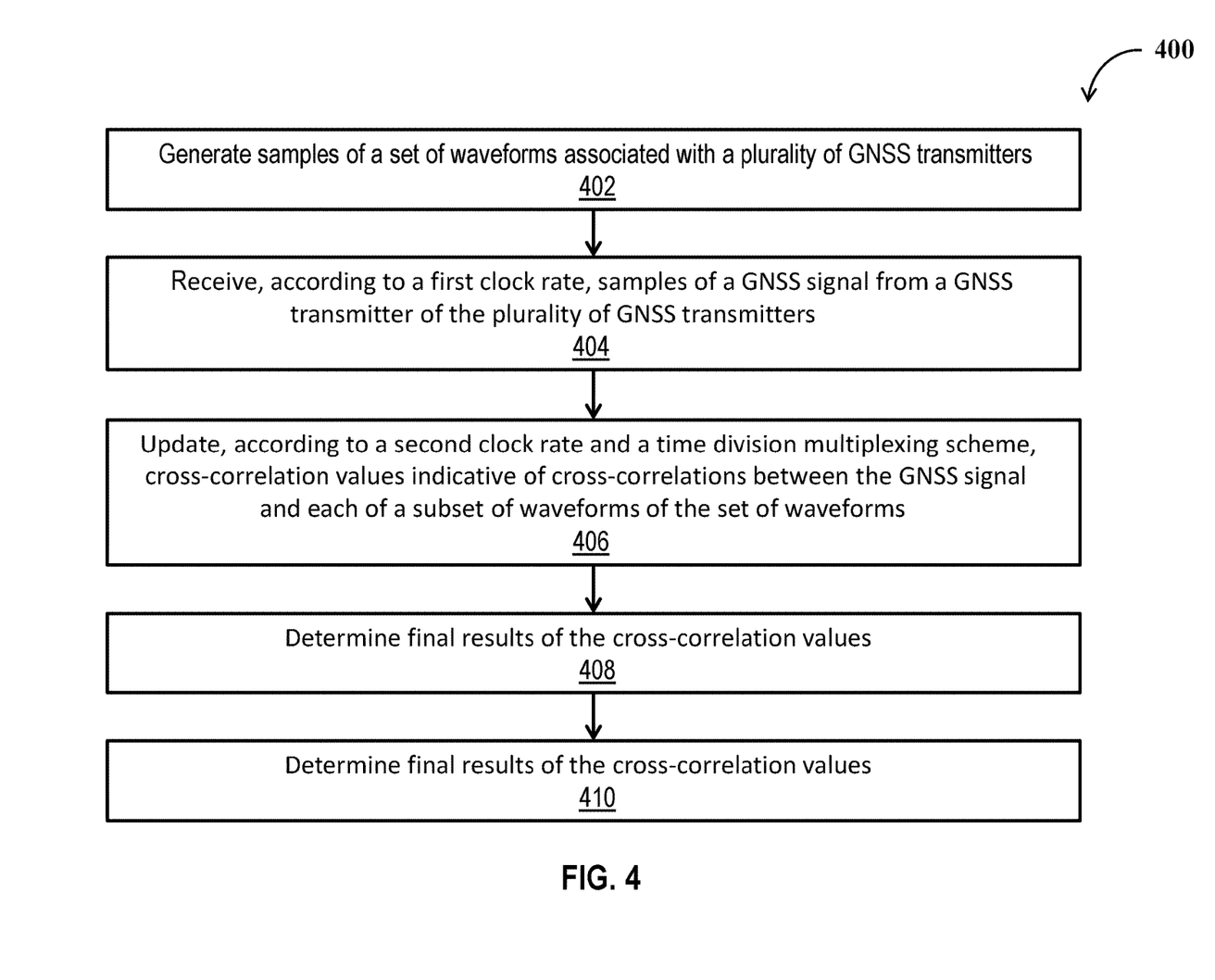
FIG. 4 shows a flowchart illustrating one embodiment of a method of processing global navigation satellite system (GNSS) input signals within a GNSS receiver, according to inventive concepts of the current disclosure.

Referring now to FIG. 4, a flowchart illustrating one embodiment of a method 400 of processing global navigation satellite system (GNSS) input signals within a GNSS receiver is shown, according to inventive concepts of the current disclosure. The method 400 can include generating samples of a set of waveforms, such that each waveform of the set of waveforms is associated with a corresponding GNSS transmitter of a plurality of GNSS transmitters (ACT 402). The method 400 can include receiving, according to a first clock rate, samples of a GNSS signal from a GNSS transmitter of the plurality of GNSS transmitters (ACT 404). The method 400 can include updating, according to a second clock rate and a time division multiplexing scheme, cross-correlation values indicative of cross-correlations between the GNSS signal and each of a subset of waveforms of the set of waveforms (ACT 406). The method 400 can include determining final results of the cross-correlation values based on the updating of the cross-correlation values according to the second clock rate and the time division multiplexing scheme (ACT 408). The method 400 can include identifying the GNSS transmitter among the plurality of GNSS transmitters based on the final results of the cross correlation values (ACT 410).

The method 400 can include a code generator of the GNSS receiver generating replicates of waveforms (or ranging codes) associated with each GNSS transmitter of the plurality of GNSS transmitters (ACT 402). As discussed above with regard to FIG. 1, each ranging code can be a pseudo random number or a spreading code. The code generator can generate, for each ranging code of a plurality of ranging codes, a respective waveform (or pseudo-random number) representing a local replicate of that ranging code. Since a GNSS transmitter can switch between different ranging codes used to encode respective positioning signals, the generating of local replicates of ranging codes can be can be synchronized with a plurality of GNSS transmitters (or code generators thereof). For example, at any time instance, the code generator can generate, for each of the plurality of GNSS transmitters, a replicate of the ranging code used by that GNSS transmitter at that time instance.

The method 400 can include receiving, according to a first clock rate, samples of a GNSS signal from a GNSS transmitter of the plurality of GNSS transmitters (ACT 404). As discussed with regard to FIG. 1, the GNSS receiver can receive GNSS signals at first clock rate referred to herein as the data clock rate. The GNSS receiver can receive the GNSS signals (or samples thereof) via multiple communication channels.

The method 400 can include updating, according to a second clock rate and a time division multiplexing scheme, cross-correlation values indicative of cross-correlations between the GNSS signal and each of a subset of waveforms of the set of waveforms (ACT 406). A streaming correlator circuit (such as streaming correlator circuit 100 of FIG. 1) of the GNSS receiver can be configured or designed to operate at a second clock rate (also referred to as processing clock rate) that is at least multiple times the data clock rate. The streaming correlator circuit can iteratively update (or compute) cross-correlation values representing cross correlations between an input signal and streams of time shifted versions of various ranging codes. As discussed with regard to FIGS. 1 and 2, the streaming correlator circuit can update the cross correlation values according to a time division multiplexing scheme where, for example, at each processing clock cycle, cross-correlation values associated with time shifted versions of one ranging code of the plurality of ranging codes can be updated.

The method 400 can include determining final results of the cross-correlation values based (ACT 408), and identifying the GNSS transmitter among the plurality of GNSS transmitters based on the final results of the cross correlation values (ACT 410). The streaming correlator circuit (as discussed with regard to FIG. 1) can iteratively update the cross-correlation values until all samples of the time shifted versions of the ranging codes are processed. The final values represent the cross-correlations between the input signal and the time shifted versions of the plurality of ranging codes. A processor of the GNSS receiver can use the final results to identify the GNSS transmitter corresponding to each GNSS signal received by the GNSS receiver and/or the position of the GNSS receiver as discussed above with regard to FIG. 1.

Embodiments described herein allow for efficient implementations of GNSS receivers that can support a relatively large number of ranging codes. Specifically, a GNSS receiver can include one or more streaming correlator circuits, each of which can be shared for cross-correlating GNSS signals with multiple ranging codes (or time shifted versions thereof). The sharing of the streaming correlator circuits allows for significant hardware savings (e.g., less circuit components compared to using a separate correlator circuit for each ranging code). The hardware savings lead to a reduction in power consumption, for example, by eliminating (or mitigating) leakage power from otherwise a larger number of correlator circuits. The hardware savings also lead to a reduction in resources used in an FPGA, or a reduction in the area of an ASIC, therefore improving manufacturing yield and reducing cost. Furthermore, the GNSS receiver technology described in this disclosure allows for scalability with ASIC technology. Specifically, as silicon technology nodes get even smaller, faster clocks in ASICs and FPGAs can allow for increased number of supported ranging channels per streaming controller circuit and more efficiency.

The construction and arrangement of the systems and methods are described herein as illustrative examples and are not to be construed as limiting. Although only a few embodiments have been described in detail in this disclosure, many modifications are possible (e.g., variations in sizes, dimensions, structures, shapes and proportions of the various elements, values of parameters, mounting arrangements, use of materials, colors, orientations). For example, the position of elements may be reversed or otherwise varied and the nature or number of discrete elements or positions may be altered or varied. Accordingly, all such modifications are intended to be included within the scope of the inventive concepts disclosed herein. The order or sequence of any operational flow or method of operations may be varied or re-sequenced according to alternative embodiments. Other substitutions, modifications, changes, and omissions may be made in the design, operating conditions and arrangement of the exemplary embodiments without departing from the broad scope of the inventive concepts disclosed herein.

What is claimed is:

1. A global navigation satellite system (GNSS) receiver comprising:
   a code generator configured to generate samples of a set of waveforms, each waveform of the set of waveforms associated with a corresponding GNSS transmitter of a plurality of GNSS transmitters;
   a signal correlator circuit configured to:
   receive, according to a first clock rate, samples of a first signal from a first GNSS transmitter of the plurality of GNSS transmitters;

update, according to a second clock rate and a time division multiplexing scheme, cross-correlation values indicative of cross-correlations between the first signal and each of a subset of waveforms of the set of waveforms, the second clock rate equal to at least multiple times the first clock rate; and determine final results of the cross-correlation values based on the updating of the cross-correlation values according to the second clock rate and the time division multiplexing scheme; and a processor configured to identify the first GNSS transmitter among the plurality of GNSS transmitters based on the final results of the cross correlation values;

wherein the signal correlator circuit further comprises:
  a code generator interface configured to provide samples of a plurality of ranging codes, each ranging code of the plurality of ranging codes associated with a corresponding GNSS transmitter of a plurality of GNSS transmitters;
  a circular buffer communicatively coupled to the code generator interface and configured to:
    store samples of the plurality of ranging codes; and
    output, according to a first clock rate and a time division multiplexing scheme, time shifted streams of each of the plurality of ranging codes.

2. The GNSS receiver of claim 1, wherein the signal correlator circuit comprises a circular buffer configured to:
  store the samples of the subset of waveforms generated by the code generator; and
  output, to the signal correlator circuit, time shifted streams of each of the subset waveforms.

3. The GNSS receiver of claim 2, wherein the circular buffer is configured to:
  output, at a first clock cycle of the second clock rate, samples of a plurality of time shifted streams of a first waveform of the plurality of waveforms; and
  output, at a second clock cycle of the second clock rate subsequent to the first clock cycle, samples of a plurality of time shifted streams of a second waveform of the plurality of waveforms.

4. The GNSS receiver of claim 2, wherein the circular buffer comprises a write pointer and a plurality of read pointers.

5. The GNSS receiver of claim 2, wherein the signal correlator circuit comprises a switch to feed the circular buffer with samples of the plurality of waveforms, the switch alternately switching between the plurality of waveforms.

6. The GNSS receiver of claim 1, wherein the signal correlator circuit comprises:
  a plurality of parallel correlator circuit modules, associated with distinct time shifted versions of the plurality of waveforms, for updating the cross-correlation values indicative of cross-correlations between the first signal and each of the subset of waveforms of the set of waveforms, each correlator circuit module to cross-correlate the first signal with versions of the plurality of waveforms time shifted by a time shift value associated with the correlator circuit module.

7. The GNSS receiver of claim 6, wherein each correlator circuit module comprises a multiplier, an adder, and a memory buffer, the memory buffer forming a closed loop with the adder.

8. The GNSS receiver of claim 1, wherein the signal correlator circuit is configured to receive, according to the first clock rate, samples of a plurality of signals from the plurality of GNSS transmitters, each signal associated with a corresponding GNSS transmitter of the plurality of GNSS transmitters.

9. The GNSS receiver of claim 8, wherein the signal correlator circuit includes a switch communicatively coupling a plurality of input channels to a plurality of correlator circuit modules of the signal correlator circuit, each channel of the plurality of channels associated with a corresponding signal of the plurality of signals and each of the plurality of correlator circuit modules associated with distinct time shifted versions of the plurality of waveforms.

10. The GNSS receiver of claim 8, wherein the signal correlator circuit is configured to cross-correlate each of the plurality of signals to time shifted versions of a corresponding subset of waveforms of the set of waveforms.

11. The GNSS receiver of claim 10, wherein the processor is configured to:
  identify for each signal of the plurality of signals a corresponding GNSS transmitter of the plurality of GNSS transmitters based on the cross-correlating of each of the plurality of signals to the time shifted versions of the corresponding subset of waveforms of the set of waveforms; and
  determine a geographical location of the GNSS receiver based on the identified GNSS transmitters.

12. The GNSS receiver of claim 1 comprising:
  a plurality of signal correlator circuits; and
  one or more processors communicatively coupled to the plurality of signal correlator circuits.

13. The GNSS receiver of claim 1, wherein the plurality of GNSS transmitters include:
  a satellite transmitter; or
  a pseudolite transmitter.

14. The global navigation satellite system (GNSS) receiver of claim 1, wherein said signal correlator circuit, comprises:
  a plurality of correlator circuit modules arranged in parallel to one another, each correlator circuit module configured to:
    receive, according to a second clock rate, samples of a first signal associated with a first GNSS transmitter of the plurality of GNSS transmitters, the first clock rate equal to at least multiple times the second clock rate;
    receive, according to the first clock rate, from the circular buffer, samples of streams of the plurality of ranging codes time shifted by a time shift value associated with the correlator circuit module;
    update, according to the second clock rate, cross-correlation values indicative of cross-correlations between the first signal and the streams of the plurality of ranging codes time shifted by a time shift value associated with the correlator circuit module; and
    determine final results of the cross-correlation values based on the updating of the cross-correlation values according to the second clock rate.

15. The signal correlator circuit of claim 14, wherein the circular buffer includes:
  a write pointer for use to store the samples of the plurality of ranging codes; and
  a plurality of read pointers, each read pointer for use to output samples of streams of the plurality of ranging codes time shifted by a time shift value associated with the read pointer.

16. The signal correlator circuit of claim 14 comprising a switch, communicatively coupled to the code generator interface and to the circular buffer, to feed the circular buffer with samples of the plurality of ranging codes, the switch alternately switching between the plurality of ranging codes.

17. The signal correlator circuit of claim 14, wherein each correlator circuit module includes a multiplier, an adder, and a memory buffer, the memory buffer forming a closed loop with the adder.

18. The signal correlator circuit of claim 14 comprising a switch communicatively coupling a plurality of GNSS input channels to the plurality of correlator circuit modules.

19. The signal correlator circuit of claim 14 comprising an accumulator buffer to store the final results of the cross-correlation values.

* * * * *